United States Patent
Kato et al.

(10) Patent No.: US 9,186,657 B2
(45) Date of Patent: *Nov. 17, 2015

(54) EXHAUST GAS PURIFICATION CATALYST SUPPRESSING INFLUENCE OF IRON COMPOUND

(71) Applicant: MITSUBISHI HITACHI POWER SYSTEMS, LTD., Yokohama (JP)

(72) Inventors: Yasuyoshi Kato, Hiroshima (JP); Naomi Imada, Hiroshima (JP); Keiichiro Kai, Hiroshima (JP)

(73) Assignee: Mitsubishi Hitachi Power Systems, Ltd., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/888,700

(22) Filed: May 7, 2013

(65) Prior Publication Data

US 2013/0251612 A1 Sep. 26, 2013

Related U.S. Application Data

(62) Division of application No. 12/934,301, filed as application No. PCT/JP2009/055903 on Mar. 25, 2009, now abandoned.

(30) Foreign Application Priority Data

Mar. 25, 2008 (JP) ................. 2008-078280

(51) Int. Cl.
| | | |
|---|---|---|
| B01D 53/56 | (2006.01) | |
| B01D 53/86 | (2006.01) | |
| B01D 53/34 | (2006.01) | |
| B01J 8/00 | (2006.01) | |
| C01C 3/00 | (2006.01) | |
| C01B 21/00 | (2006.01) | |
| B01J 27/198 | (2006.01) | |
| B01J 27/188 | (2006.01) | |
| B01J 27/19 | (2006.01) | |
| B01J 23/00 | (2006.01) | |
| B01J 23/02 | (2006.01) | |
| B01J 23/08 | (2006.01) | |
| B01J 21/04 | (2006.01) | |
| B01J 27/199 | (2006.01) | |
| B01J 21/06 | (2006.01) | |
| B01J 23/22 | (2006.01) | |
| B01J 23/28 | (2006.01) | |
| B01J 23/30 | (2006.01) | |
| B01J 37/02 | (2006.01) | |
| B01J 37/28 | (2006.01) | |
| B01D 53/64 | (2006.01) | |
| B01J 35/06 | (2006.01) | |
| B01J 37/04 | (2006.01) | |

(52) U.S. Cl.
CPC .............. *B01J 27/199* (2013.01); *B01D 53/64* (2013.01); *B01D 53/8628* (2013.01); *B01D 53/8665* (2013.01); *B01J 21/063* (2013.01); *B01J 23/22* (2013.01); *B01J 23/28* (2013.01); *B01J 23/30* (2013.01); *B01J 37/0225* (2013.01); *B01J 37/28* (2013.01); *B01D 2255/20707* (2013.01); *B01D 2255/20723* (2013.01); *B01D 2255/20769* (2013.01); *B01D 2255/20776* (2013.01); *B01J 35/06* (2013.01); *B01J 37/04* (2013.01)

(58) Field of Classification Search
USPC ............... 423/237, 239.1; 502/209, 210, 211, 502/309, 312, 321, 322, 323, 350, 351, 355, 502/439

See application file for complete search history.

(56) References Cited

U.S. PATENT DOCUMENTS

| | | | | |
|---|---|---|---|---|
| 4,520,127 A | * | 5/1985 | Otake et al. .................... | 502/209 |
| 4,833,113 A | * | 5/1989 | Imanari et al. ................. | 502/309 |
| 4,851,381 A | * | 7/1989 | Hums ........................... | 502/209 |
| 4,859,439 A | * | 8/1989 | Rikimaru et al. ........... | 423/239.1 |
| 4,891,348 A | * | 1/1990 | Imanari et al. ................. | 502/309 |
| 4,975,256 A | * | 12/1990 | Hegedus et al. ............ | 423/239.1 |
| 4,977,127 A | * | 12/1990 | Rikimaru et al. ............. | 502/309 |
| 5,587,136 A | * | 12/1996 | Ikeyama et al. ............ | 423/239.1 |
| 6,027,697 A | * | 2/2000 | Kurihara et al. ............... | 422/171 |
| 6,419,889 B1 | * | 7/2002 | Boxhoorn et al. ......... | 423/239.1 |
| 7,264,784 B2 | * | 9/2007 | Kuma et al. .................... | 423/210 |
| 2002/0028171 A1 | * | 3/2002 | Goetsch et al. ............... | 423/237 |
| 2005/0085383 A1 | * | 4/2005 | Hoj et al. ...................... | 502/412 |

* cited by examiner

Primary Examiner — Cam N. Nguyen
(74) Attorney, Agent, or Firm — Fay Sharpe LLP

(57) ABSTRACT

An exhaust gas purification catalyst contains titanium oxide as a main component and an oxide of one element or two or more elements selected from the group consisting of tungsten (W), molybdenum (Mo), and vanadium (V) as an active component, wherein the exhaust gas purification catalyst contains phosphoric acid or a water soluble phosphoric acid compound so that the atomic ratio of phosphorus (P) to a catalytically active component represented by the following formula is more than 0 and 1.0 or less; P/catalytically active component (atomic ratio)=number of moles of P/(number of moles of W+number of moles of Mo+number of moles of V).

20 Claims, No Drawings

EXHAUST GAS PURIFICATION CATALYST SUPPRESSING INFLUENCE OF IRON COMPOUND

CROSS REFERENCE TO RELATED APPLICATION

This application is a divisional of U.S. application Ser. No. 12/934,301 filed Dec. 28, 2010, which application is the U.S. national stage entry of International Application No. PCT/JP2009/055903 filed Mar. 25, 2009, which application claims priority to and the benefit of JP 2008-078280 filed Mar. 25, 2008. The disclosures of each of said applications are incorporated herein by reference in their entirety.

TECHNICAL FIELD

The present invention relates to an exhaust gas purification catalyst, and more particularly to, a catalyst used for oxidizing elemental mercury (Hg) as well as reducing nitrogen oxides (NOx) contained in coal combustion exhaust gas by ammonia, which can maintain to a very low level an activity of oxidizing SO2 contained in the exhaust gas to SO3 for a long period of time by suppressing an increase in the activity of oxidizing SO2 with the lapse of time by an increase in Fe compound, and a method of producing the same.

BACKGROUND ART

As the denitration catalyst for ammonia catalytic reduction, containing titanium oxide as a main component has high activity and favorable durability, it is generally used worldwide for the treatment of exhaust gas such as gas released from a boiler and constitutes the mainstream denitration catalyst (Patent Document 1).

In recent years, there is a rapid increase in demand for energy and coals having high sulfur content (i.e., high S coals) start to be used as fuel. In addition to this, a trouble caused by SO3 increases, for example, part of SO2 is oxidized to SO3 due to a SO2 oxidizing activity of a denitration catalyst so that visible stack plumes originating from SO3 is released from a stack or a downstream equipment in a denitration apparatus is corroded, etc. As such, in accordance with increased needs for a denitration catalyst having very low SO2 oxidizing activity, a catalyst with modified composition (Patent Document 2) and a catalyst having a distribution in concentration of the catalyst components (Patent Document 3) are known.

Patent Document 1: Japanese Patent Application Laid-Open (JP-A) No. 50-128681
Patent Document 2: JP-A No. 2-184342
Patent Document 3: JP-A No. 09-220468

DISCLOSURE OF THE INVENTION

Problems to be Solved by the Invention

Meanwhile, with regard to the SO2 oxidation active site of a denitration catalyst, there are SO2 oxidation active site that is intrinsic to the catalyst component and SO2 oxidation active site that is newly formed by adhesion of a Fe component contained in combustion ash to the catalyst or by migration of a Fe component accompanied with corrosion of a substrate to the catalyst, when a metal substrate is used for the catalyst. In particular, due to the latter, a dramatic increase in SO2 oxidizing activity is caused when the degree of forming SO2 active site in the catalyst is huge. In particular, since Fe2O3 is contained at high concentration of 20 to 30% by weight in combustion ash of high S coals that are produced in the United States, etc., for the treatment of combustion exhaust gas of such high S coals, it is necessary to suppress an increase in SO2 oxidizing activity caused by adhesion of Fe2O3 to the catalyst.

According to the conventional technology above described, SO2 oxidation rate of the catalyst component itself can be suppressed to a low level, and therefore sufficiently low initial SO2 oxidation rate is obtained for the catalyst. However, sufficient consideration regarding the suppression of an increase in SO2 oxidation rate of the catalyst that is caused by an increase in a Fe component in the latter case was not made, and therefore the SO2 oxidation rate of the catalyst with the lapse of time is still big and improvements are needed in several aspects.

An object of the present invention is to provide, considering the problems of the conventional technology above, an exhaust gas purification catalyst that can suppress an increase in SO2 oxidation with an increase in a Fe component in the denitration catalyst with the lapse of time attributable to internal and external causes and, even in exhaust gases of fuels having a high Fe content such as high S coals, can realize operation at a low SO2 oxidation rate for a long period of time, and a method of producing the same.

Means for Solving the Problems

Inventions that are claimed in the present application to achieve the object described above are as follows:

An exhaust gas purification catalyst containing titanium oxide as a main component and an oxide of one element or two or more elements selected from the group consisting of tungsten (W), molybdenum (Mo), and vanadium (V) as an active component, in which the catalyst contains phosphoric acid or a water soluble phosphoric acid compound so that the atomic ratio of phosphorus (P) to a catalytically active component represented by the following formula is more than 0 and 1.0 or less; P/catalytically active component (atomic ratio)=number of moles of P/(number of moles of W+number of moles of Mo+number of moles of V)

An exhaust gas purification catalyst, wherein the catalyst described in (1) above is supported on a metal substrate.

A method of purifying exhaust gas, wherein the catalyst described in (1) or (2) above is used for purification of exhaust gas including nitrogen oxide and ashes containing a Fe component.

A method of producing an exhaust gas purification catalyst, including: adding an oxide or an oxo-acid salt of one element or two or more elements selected from the group consisting of tungsten (W), molybdenum (Mo), and vanadium (V) to titanium oxide; adding water; and kneading followed by drying and calcination, wherein phosphoric acid or a water soluble phosphoric acid compound is added to the oxide or the oxo-acid salt thereof for a reaction so that the atomic ratio of P to a catalytically active component represented by the following formula is more than 0 and 1.0 or less; P/catalytically active component (atomic ratio)=number of moles of P/(number of moles of W+number of moles of Mo+number of moles of V).

A method of producing an exhaust gas purification catalyst, including: adding an oxide or an oxo-acid salt of one element or two or more elements selected from the group consisting of tungsten (W), molybdenum (Mo), and vanadium (V) to titanium oxide; adding water; kneading followed by drying and calcination; and immersing the resultant in a solution that is prepared separately in advance by adding phosphoric acid or a water soluble phosphoric acid compound to an oxide or an oxo-acid salt of one element or two or more elements selected from the group consisting of tungsten (W), molybdenum (Mo), and vanadium (V) to be reacted so that the atomic ratio of P to a catalytically active component represented by the following formula is more than 0 and 1.0 or less; P/catalytically active component (atomic ratio)=number of moles of P/(number of moles of W+number of moles of Mo+number of moles of V).

Effects of the Invention

According to the invention, by having the atomic ratio of P to a catalytically active component in the catalyst to be within the range described above, formation of SO2 oxidation active site in the catalyst that is caused by the adhesion of a Fe component comprised in ash from gas to be treated is suppressed, and therefore SO2 oxidation rate can be maintained at a low level for a long period of time. In particular, for a catalyst using a metal substrate, formation of SO2 active site caused by corrosion product containing a Fe component, that is generated when the catalyst is used in harsh condition, is prevented so that even for the catalyst using a metal substrate as a carrier the SO2 oxidation rate can be maintained at a low level for a long period of time.

As the catalyst of the invention has not only high denitrating performance and Hg oxidizing performance but also low SO2 oxidation rate, when it is used for denitration of exhaust gas from a high S coal boiler used in the United States, etc., generation of SO3 can be suppressed to a low level. Furthermore, since it is difficult for SO2 oxidation rate to increase even when the Fe component contained in ash or the like migrates into the catalyst, problems such as generation of purple smoke due to SO3 resulting from oxidation of SO2 can be avoided when it is applied for exhaust gas of high S coals containing a great amount of a Fe component.

Inventors of the present invention intensively studied the increase in SO2 oxidation rate of the catalyst caused by a Fe component. As a result, it was found that the increase in SO2 oxidation rate proceeds through the following steps (1) to (4).

(1) Fe component such as iron oxide or the like adheres on the surface of a catalyst or corrosion of a metal substrate occurs at the interface between the metal substrate and the catalyst component, but no increase in SO2 oxidation rate occurs during this step; (2) The Fe component in the catalyst is sulphated by SOx present in exhaust gas; (3) The sulphate is dissolved in water which is absorbed when operation of a combustion furnace is on hold, and as a result, it migrates as a Fe ion to the inside of the catalyst; and (4) The migrated Fe ion is adsorbed onto titanium oxide to form SO2 oxidation active site.

The inventors of the present invention were curious about the possibility of preventing efficiently an increase in SO2 oxidation rate by blocking the formation of SO2 oxidation active site during step (4) among the four steps described above. In this connection, as a means therefor, a phosphorus compound is included in the catalyst so that the Fe component is reacted with the phosphorus compound to form an insoluble iron phosphate, and as a result the increase in SO2 oxidation rate is prevented.

According to the invention, part of the catalytically active component is present as a complex resulting from a qualitative reaction with phosphoric acid/phosphoric acid compound, and it is believed that Fe ion and the complex of phosphoric acid and the active component undergo the reaction as follows:

  (Formula 1)

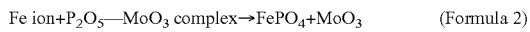  (Formula 2)

  (Formula 3)

With the reactions above, the Fe ion forms insoluble iron phosphate by which absorption onto TiO2 is inhibited, and therefore an increase in SO2 oxidation rate is prevented. Furthermore, according to the invention, WO3, MoO3 and V2O5 are also formed as an active component along with the generation of FePO4. As such, it is also expected to obtain the effect of maintaining the denitration activity or Hg oxidation activity at a high level.

BEST MODE FOR CARRYING OUT THE INVENTION

To obtain the catalyst of the invention, it is important to have the atomic ratio of P to a catalytically active component in the catalyst to be more than 0 and 1.0 or less. As P reacts with the catalytically active component to lower the denitration activity, there is a tendency that denitration activity is reduced by excessive P. In order for the suppression of an increase in $SO_2$ oxidation rate by adhesion of a Fe component and the denitration activity to be compatible with each other, it is preferable that the atomic ratio of P to a catalytically active component is more than 0 and 0.5 or less.

As for a raw material used for preparation of the catalyst, any one of the oxides, salts or the like of the corresponding component may be used. However, considering that the P compound needs to react with a Mo compound or a W compound and a V compound, by using soluble salts of the corresponding compound, for example, oxo acid or ammonium salts of the corresponding element and mixing them with titanium oxide in the presence of water, favorable results may be easily obtained. Phosphoric acid/phosphoric acid compound (i.e., P compound) may be directly added during the process of producing the catalyst as described above. Alternatively, a method in which a compound obtained by reacting in advance phosphoric acid/P compound (i.e., complex) or a solution containing the compound is added during a process of kneading raw materials for producing the catalyst, aside from the W, Mo, and V compounds that are added as an active component, or it is immersed after producing the catalyst or the like may be adopted. The latter method is preferable in that the influence of P on catalytic activity can be easily controlled. Examples of the water soluble phosphoric acid compound include ammonium dihydrogen phosphate and diammonium hydrogen phosphate.

To perform the purification of exhaust gas containing nitric oxides and elementary mercury (i.e., metallic mercury) by using the catalyst of the invention, a reducing agent like ammonia is injected and reacted by contact with the catalyst according to the method known per se in the art.

EXAMPLES

Hereinbelow, the present invention will be described in detail in view of specific examples.

Example 1

Titanium oxide (specific surface area: 290 m²/g, manufactured by Ishihara Sangyo K.K.) (900 g), ammonium molybdate (107 g), ammonium metavanadate (28.3 g), 85% phosphoric acid (68.3 g), silica sol (trade name: OS SOL, manufactured by Nissan Chemical Industries, Ltd.) (404 g), and water (50 g) were placed in a kneader, and then kneaded for 60 minutes. Thereafter, while silica-alumina ceramic fiber (manufactured by Toshiba Fine Flex K.K.) (151 g) was gradually added to the mixture, the mixture was kneaded for 30 minutes, to thereby yield a catalyst paste having a water content of 27% by weight. The paste obtained was applied onto a base material (thickness: 0.7 mm) produced by subjecting a SUS 430 stainless steel plate (thickness: 0.2 mm) to a metal-lath processing; the base material was sandwiched between two polyethylene sheets; and the thus-sandwiched base material was passed through a pair of pressure rollers so that the meshes of the metal lath base were filled with the paste. The paste-filled base material was air-dried, and then calcined at 500° C. for two hours, to thereby obtain a catalyst of the invention. Composition of the catalyst of this invention was found to have a Ti/Mo/V (atomic proportions) of 93/5/2, and a P/(Mo+V) (atomic ratio) of 0.5.

Example 2

The catalyst of the invention was obtained in the same manner as Example 1, except that ammonium molybdate used in Example 1 was replaced by an equimolar amount of ammonium metatungstate, to thereby obtain a catalyst of the invention. Composition of the catalyst of this invention was found to have a Ti/W/V (atomic proportions) of 93/5/2, and a P/(Mo+V) (atomic ratio) of 0.5.

Comparative Examples 1 and 2

The catalyst was prepared in the same manner as Example 1 and Example 2, except that no phosphoric acid was added.

Examples 3 to 7

Titanium oxide (specific surface area: 290 m$^2$/g, manufactured by Ishihara Sangyo K.K.) (900 g), ammonium molybdate (113 g), ammonium metavanadate (105 g), 85% phosphoric acid (18 g (Example 3), 53 g (Example 4), 88 g (Example 5), 124 g (Example 6) and 177 g (Example 7)) and silica sol (trade name: OS SOL, manufactured by Nissan Chemical Industries, Ltd.) (404 g) were placed in a kneader, and then kneaded for 60 minutes. Thereafter, while silica-alumina ceramic fiber (manufactured by Toshiba Fine Flex K.K.) (151 g) was gradually added to the mixture, the mixture was kneaded for 30 minutes, to thereby obtain a catalyst paste having a water content of 27% by weight. The obtained paste was applied onto a base material (thickness: 0.7 mm) produced by subjecting a SUS 430 stainless steel plate (thickness: 0.2 mm) to a metal-lath processing; the base material was sandwiched between two polyethylene sheets; and the thus-sandwiched base material was passed through a pair of pressure rollers so that the meshes provided in the metal lath base were filled with the paste. The paste-filled base material was air-dried, and then calcined at 500° C. for two hours, to thereby obtain a catalyst of the invention. Composition of the catalyst of this invention was found to have a Ti/Mo/V (atomic proportions) of 88/5/7 and a P/(Mo+V) (atomic ratio) of 0.1, 0.3, 0.5, 0.7 and 1.0 for Example 3 to 7, respectively.

Comparative Example 3

The catalyst was prepared in the same manner as Example 3, except that no phosphoric acid/phosphoric acid compound was added.

Example 8

Titanium oxide (specific surface area: 290 m$^2$/g, manufactured by Ishihara Sangyo K.K.) (900 g), ammonium molybdate (113 g), ammonium metavanadate (42.9 g), ammonium dihydrogen phosphate (110 g), silica sol (trade name: OS SOL, manufactured by Nissan Chemical Industries, Ltd.) (404 g) and water (50 g) were placed in a kneader, and then kneaded for 60 minutes. Thereafter, while silica-alumina ceramic fiber (manufactured by Toshiba Fine Flex K.K.) (151 g) was gradually added to the mixture, the mixture was kneaded for 30 minutes, to thereby obtain a catalyst paste having a water content of 27% by weight. The obtained paste was applied onto a base material (thickness: 0.7 mm) produced by subjecting a SUS 430 stainless steel plate (thickness: 0.2 mm) to a metal-lath processing; the base material was sandwiched between two polyethylene sheets; and the thus-sandwiched base material was passed through a pair of pressure rollers so that the meshes provided in the metal lath base were filled with the paste. The paste-filled base material was air-dried, and then calcined at 500° C. for two hours, to thereby obtain a catalyst of the invention. Composition of the catalyst of this invention was found to have a Ti/Mo/V (atomic proportions) of 93/5/3 and a P/(Mo+V) (atomic ratio) of 0.4.

Example 9

Titanium oxide (specific surface area: 290 m$^2$/g, manufactured by Ishihara Sangyo K.K.) (900 g), molybdenum trioxide (88 g), ammonium metavanadate (42.9 g), ammonium dihydrogen phosphate (110 g), silica sol (trade name: OS SOL, manufactured by Nissan Chemical Industries, Ltd.) (404 g) and water (50 g) were placed in a kneader, and then kneaded for 60 minutes. Thereafter, while silica-alumina ceramic fiber (manufactured by Toshiba Fine Flex K.K.) (151 g) was gradually added to the mixture, the mixture was kneaded for 30 minutes, to thereby obtain a catalyst paste having a water content of 27%. The obtained paste was applied onto a base material (thickness: 0.7 mm) produced by subjecting a SUS 430 stainless steel plate (thickness: 0.2 mm) to a metal-lath processing; the base material was sandwiched between two polyethylene sheets; and the thus-sandwiched base material was passed through a pair of pressure rollers so that the meshes provided in the metal lath base were filled with the paste. The paste-filled base material was air-dried, and then calcined at 500° C. for two hours, to thereby obtain a catalyst of the invention. Composition of the catalyst of this invention was found to have a Ti/Mo/V (atomic proportions) of 93/5/3 and a P/(Mo+V) (atomic ratio) of 0.4.

Comparative Examples 4 and 5

The catalyst was prepared in the same manner as Examples 8 and Examples 9, except that no ammonium dihydrogen phosphate was added.

Example 10

Ammonium metavanadate (42.9 g) was dispersed in water (100 ml) and added with 85% phosphoric acid (45 g). According to the reaction between them, a red slurry-like product was obtained.

Separately from the above, titanium oxide (specific surface area: 290 m$^2$/g, manufactured by Ishihara Sangyo K.K.) (900 g), ammonium molybdate (117 g), ammonium metavanadate (103 g), and silica sol (trade name: OS SOL, manufactured by Nissan Chemical Industries, Ltd.) (404 g) were placed in a kneader, and then kneaded for 30 minutes to obtain a past. To the paste, the red slurry obtained from the above was added and kneaded further for 30 minutes. Thereafter, while silica-alumina ceramic fiber (manufactured by Toshiba Fine Flex K.K.) (151 g) was gradually added to the mixture, the mixture was kneaded for 30 minutes, to thereby obtain a catalyst paste having a water content of 27% by weight. The obtained paste was applied onto a base material (thickness: 0.7 mm) produced by subjecting a SUS 430 stainless steel plate (thickness: 0.2 mm) to a metal-lath processing; the base material was sandwiched between two polyethylene sheets; and the thus-sandwiched base material was passed through a pair of pressure rollers so that the meshes provided in the metal lath base were filled with the paste, to thereby obtain a catalyst of the invention. Composition of the catalyst of this invention was found to have a Ti/Mo/V (atomic proportions) of 85/5/10 and a P/(Mo+V) (atomic ratio) of 0.2.

Example 11

Titanium oxide (specific surface area: 290 m²/g, manufactured by Ishihara Sangyo K.K.) (900 g), ammonium metavanadate (105 g), and silica sol (trade name: OS SOL, manufactured by Chemical Industries, Ltd.) (404 g) were placed in a kneader, and then kneaded for 60 minutes. Thereafter, while silica-alumina ceramic fiber (manufactured by Toshiba Fine Flex K.K.) (151 g) was gradually added to the mixture, the mixture was kneaded for 30 minutes, to thereby obtain a catalyst paste having a water content of 27% by weight. The obtained paste was applied onto a base material (thickness: 0.7 mm) produced by subjecting a SUS 430 stainless steel plate (thickness: 0.2 mm) to a metal-lath processing; the base material was sandwiched between two polyethylene sheets; and the thus-sandwiched base material was passed through a pair of pressure rollers so that the meshes provided in the metal lath base were filled with the paste. The resulting catalyst was air-dried, and then calcined at 500° C. for two hours, to thereby obtain a catalyst of the invention.

Separately from the above, ammonium molybdate (112 g) was dispersed in water (200 ml) and added with 85% phosphoric acid (89 g) to obtain a solution in which the two components are reacted with each other. To this solution, the catalyst obtained from the above was immersed, the liquid was removed, and then the catalyst was air-dried at room temperature or calcined at 350° C. for one hour, to thereby obtain a catalyst of the invention. Composition of the catalyst of this invention was found to have a Ti/Mo/V (atomic proportions) of 88/5/7 and a P/(Mo+V) (atomic ratio) of 0.5.

Use Example 1

Each of the catalysts prepared in Examples 1 to 11 and Comparative examples 1 to 5 was cut into test pieces, each having a rectangular shape with a size of 100 mm×20 mm. The test pieces of each catalyst were brought into contact with the gas under the condition shown in Table 1 to measure the denitrating performance and the Hg oxidation rate of the catalyst. Furthermore, they were brought into contact with the gas under the condition shown in Table 2 to measure the $SO_2$ oxidizing performance of each catalyst, and the initial activity was also determined.

Meanwhile, combustion ash of bituminous coal known as high S coals (e.g., coal produced in the eastern United States, $Fe_2O_3$ content of 26% by weight) was pulverized with a ball mill until 200 mesh pass ratio is at least 95% to prepare simulated ash. This simulated ash was applied to a vat, added with the catalyst of Examples 1 to 11 and Comparative examples 1 to 5, and added further with the simulated ash to have thickness of about 1 mm. The vessel was placed in a calcination furnace in which atmosphere is adjusted to have $SO_2$ of 500 ppm, humidity of 10% and air for the remainder, and the vessel was kept at 400° C. for 50 hours. After that, the vessel was kept for 100 hours under the condition including the temperature of 35° C. and relative humidity of 100%. Accordingly, the Fe components included in the ash were forced to move into the catalyst. As a result of fluorescent X ray analysis, the $Fe_2O_3$ concentration on the surface of the catalyst was increased about 2.6% by weight on average. The $Fe_2O_3$ was increased up to 0.38% by weight on average compared to the whole components of the catalyst.

In order to determine the increase in $SO_2$ oxidation rate caused by adhesion of the Fe component to the catalyst which is obtained after the Fe migration test, $SO_2$ oxidation rate of each catalyst was measured under the condition described in Table 2. The test results and the initial performance are summarized in Table 3.

From the results of Table 3, it is found that the catalyst of the invention has higher denitration rate and Hg oxidation rate with much lower $SO_2$ oxidation rate compared to the catalyst of the Comparative examples. In addition, according to the test in which the Fe components are forced to adhere, the $SO_2$ oxidation rate has dramatically increased with the catalyst of the Comparative examples, while the increase in the $SO_2$ oxidation rate was minor for the catalyst of the present invention. Thus, it is found that the catalyst of the invention is resistant to the adhesion of a Fe component.

TABLE 1

| Item | Value |
|---|---|
| 1. Gas composition | |
| NO$x$ | 300 ppm |
| NH$_3$ | 300 ppm |
| SO$_2$ | 1000 ppm |
| O$_2$ | 3% |
| CO$_2$ | 12% |
| H$_2$O | 12% |
| Hg | 10 ng/liter |
| HCl | 30 ppm |
| 2. Gas flow amount | 3 liter/minute |
| 3. Temperature | 350° C. |
| 4. Catalyst charge amount | 20 mm width × 100 mm (entire length) 3 pieces |

TABLE 2

| Item | Value |
|---|---|
| 1. Composition | |
| SO$_2$ | 500 ppm |
| O$_2$ | 3% |
| 2. Gas flow amount | 1.2 liter/minute |
| 3. Temperature | 380° C. |
| 4. Catalyst charge amount | 20 mm width × 100 mm (entire length) 3 pieces |

TABLE 3

| | | | SO$_2$ oxidation rate (%) | |
|---|---|---|---|---|
| Catalyst | Denitration rate (%) | Hg oxidation rate (%) | Initial stage | After the Fe Adhesion test |
| Ex. 1 | 94 | 83 | 0.7 | 0.9 |
| Ex. 2 | 94 | 81 | 0.6 | 0.7 |
| Ex. 3 | 98 | 92 | 3.4 | 3.8 |
| Ex. 4 | 97 | 85 | 1.8 | 2.1 |
| Ex. 5 | 97 | 83 | 1.9 | 1.9 |

TABLE 3-continued

| Catalyst | Denitration rate (%) | Hg oxidation rate (%) | SO₂ oxidation rate (%) | |
|---|---|---|---|---|
| | | | Initial stage | After the Fe Adhesion test |
| Ex. 6 | 96 | 90 | 1.2 | 1.4 |
| Ex. 7 | 94 | 86 | 0.9 | 1.1 |
| Ex. 8 | 97 | 85 | 0.7 | 0.9 |
| Ex. 9 | 97 | 83 | 0.8 | 0.8 |
| Ex. 10 | 97 | 85 | 1.7 | 1.9 |
| Ex. 11 | 97 | 83 | 1.1 | 1.2 |
| Comp. ex. 1 | 97 | 91 | 2.7 | 4.3 |
| Comp. ex. 2 | 97 | 89 | 2.8 | 3.9 |
| Comp. ex. 3 | 98 | 86 | 23 | 21.0 |
| Comp. ex. 4 | 97 | 83 | 4.4 | 5.6 |
| Comp. ex. 5 | 98 | 92 | 3.9 | 6.2 |

The invention claimed is:

1. A method for purifying an exhaust gas, comprising:
    contacting the exhaust gas with an exhaust gas purification catalyst;
    wherein the exhaust gas purification catalyst comprises titanium oxide as a main component and an oxide of one element or two or more elements selected from the group consisting of tungsten (W), molybdenum (Mo), and vanadium (V) as an active component;
    wherein the active component is reacted with a phosphoric acid or a water soluble phosphoric acid compound to form a complex thereof so that the atomic ratio of phosphorus (P) to a catalytically active component represented by the following formula is 0.2 to 1.0; P/catalytically active component (Atomic ratio)=number of moles of P/(number of moles of W+number of moles of Mo+number of moles of V);
    wherein the exhaust gas contains nitrogen oxide and elemental mercury; and
    wherein the nitrogen oxide is reduced by ammonia.

2. The method of claim 1, wherein the exhaust gas purification catalyst is supported on a metal substrate.

3. The method of claim 1, wherein the one element or two or more elements consist of tungsten (W).

4. The method of claim 1, wherein the one element or two or more elements consist of molybdenum (Mo).

5. The method of claim 1, wherein the one element or two or more elements consist of vanadium (V).

6. The method of claim 1, wherein the one element or two or more elements consist of tungsten (W) and molybdenum (Mo).

7. The method of claim 1, wherein the one element or two or more elements consist of tungsten (W) and vanadium (V).

8. The method of claim 1, wherein the one element or two or more elements consist of molybdenum (Mo) and vanadium (V).

9. The method of claim 1, wherein the one element or two or more elements consist of tungsten (W), molybdenum (Mo), and vanadium (V).

10. The method of claim 1, wherein the atomic ratio of phosphorus (P) to catalytically active component in the exhaust gas purification catalyst is less than or equal to 0.5.

11. The method of claim 1, wherein the atomic ratio of phosphorus (P) to catalytically active component in the exhaust gas purification catalyst is less than 0.5.

12. The method of claim 1, wherein the atomic ratio of phosphorus (P) to catalytically active component in the exhaust gas purification catalyst is equal to 0.5.

13. The method of claim 1, wherein the exhaust gas purification catalyst is produced by a process comprising: adding an oxide or an oxo-acid salt of the one element or two or more elements selected from the group consisting of tungsten (W), molybdenum (Mo), and vanadium (V) to titanium oxide; adding water; and kneading followed by drying and calcination; wherein phosphoric acid or a water soluble phosphoric acid compound is added to the oxide or the oxo-acid salt thereof for reaction.

14. The method of claim 13, wherein the water soluble phosphoric acid compound is selected from the group consisting of ammonium dihydrogen phosphate and diammonium hydrogen phosphate.

15. The method of claim 1, wherein the exhaust gas purification catalyst is produced by a process comprising: adding a first oxide or a first oxo-acid salt of the one element or two or more elements selected from the group consisting of tungsten (W), molybdenum (Mo), and vanadium (V) to titanium oxide; adding water; kneading followed by drying and calcination; and immersing the resultant in a solution that is prepared separately in advance by adding phosphoric acid or a water soluble phosphoric acid compound to a second oxide or a second oxo-acid salt of the one element or two or more elements.

16. The method of claim 15, wherein the water soluble phosphoric acid compound is selected from the group consisting of ammonium dihydrogen phosphate and diammonium hydrogen phosphate.

17. The method of claim 1, wherein the atomic proportions of Ti/Mo/V in the exhaust gas purification catalyst are 93/5/2.

18. The method of claim 1, wherein the atomic proportions of Ti/Mo/V in the exhaust gas purification catalyst are 88/5/7.

19. The method of claim 1, wherein the atomic ratio of phosphorus (P) to catalytically active component in the exhaust gas purification catalyst is less than or equal to 0.3.

20. The method of claim 1, wherein the atomic ratio of phosphorus (P) to catalytically active component in the exhaust gas purification catalyst is less than or equal to 0.7.

* * * * *